Oct. 7, 1941.　　　　R. C. PIERCE　　　　2,258,031
REINFORCED ARTICLE
Filed May 17, 1940　　　　2 Sheets-Sheet 1
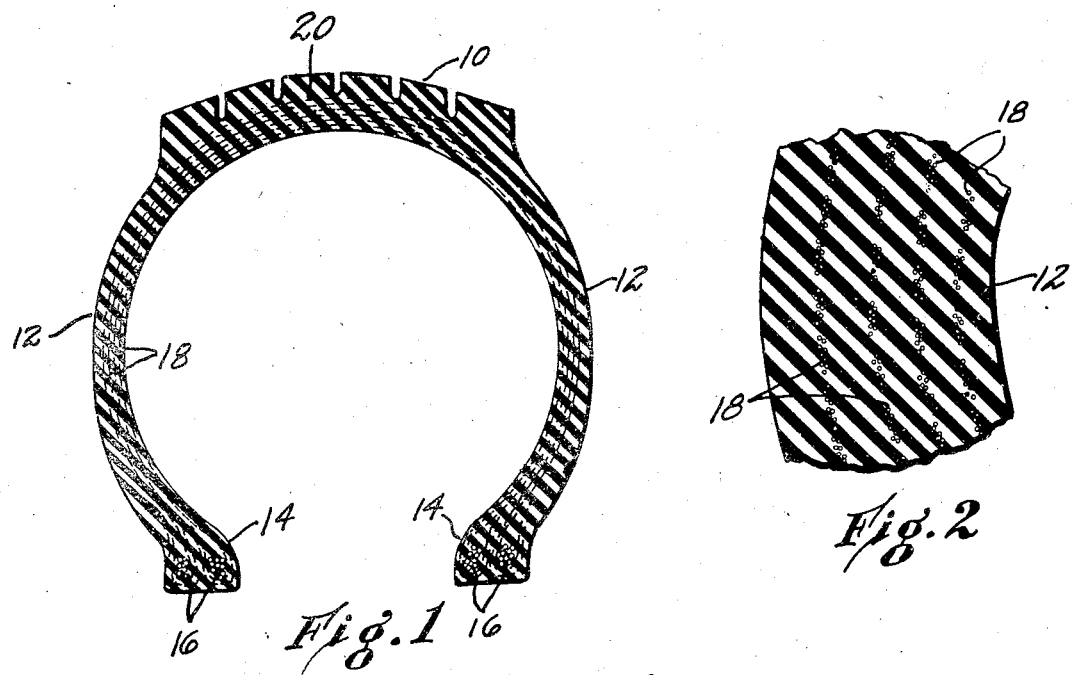
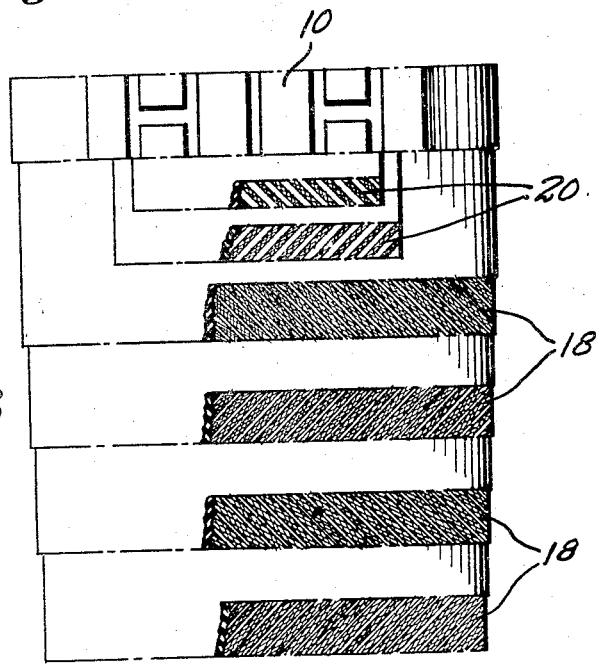
ROBERT C. PIERCE
INVENTOR.
BY McConkey and Booth
ATTORNEYS.

Oct. 7, 1941.    R. C. PIERCE    2,258,031
REINFORCED ARTICLE
Filed May 17, 1940    2 Sheets-Sheet 2
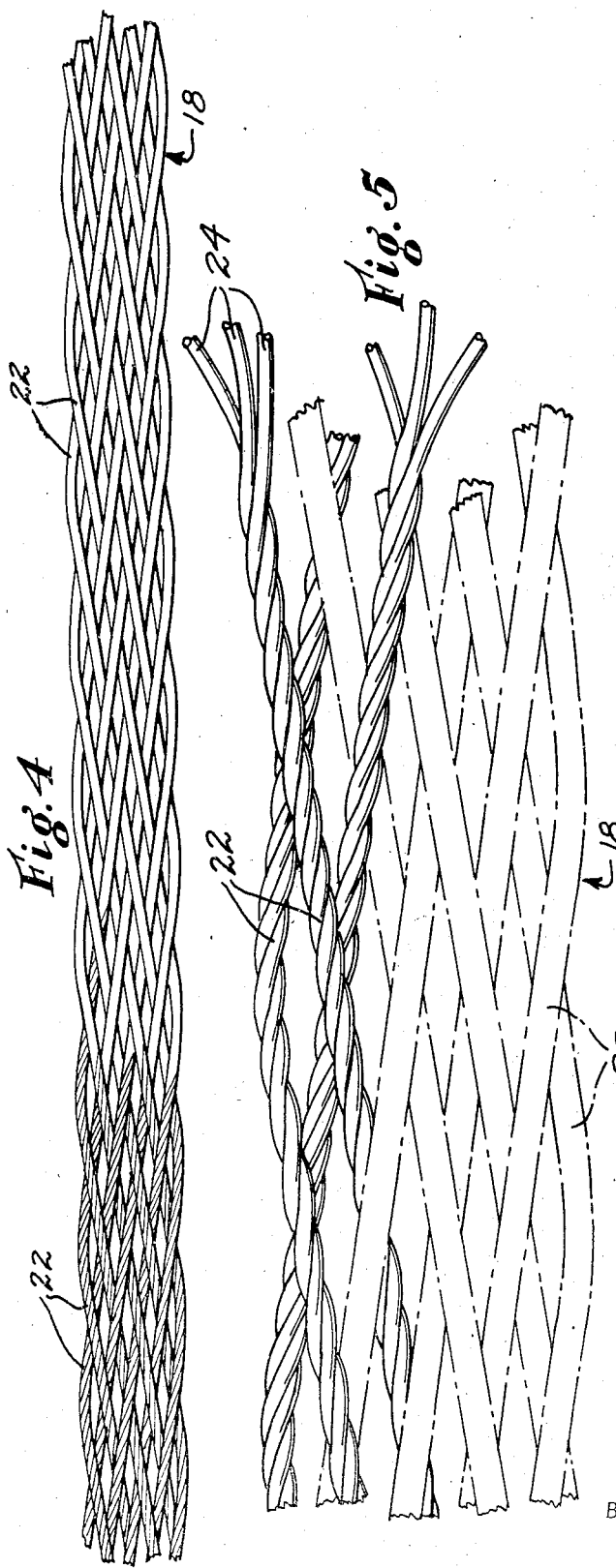
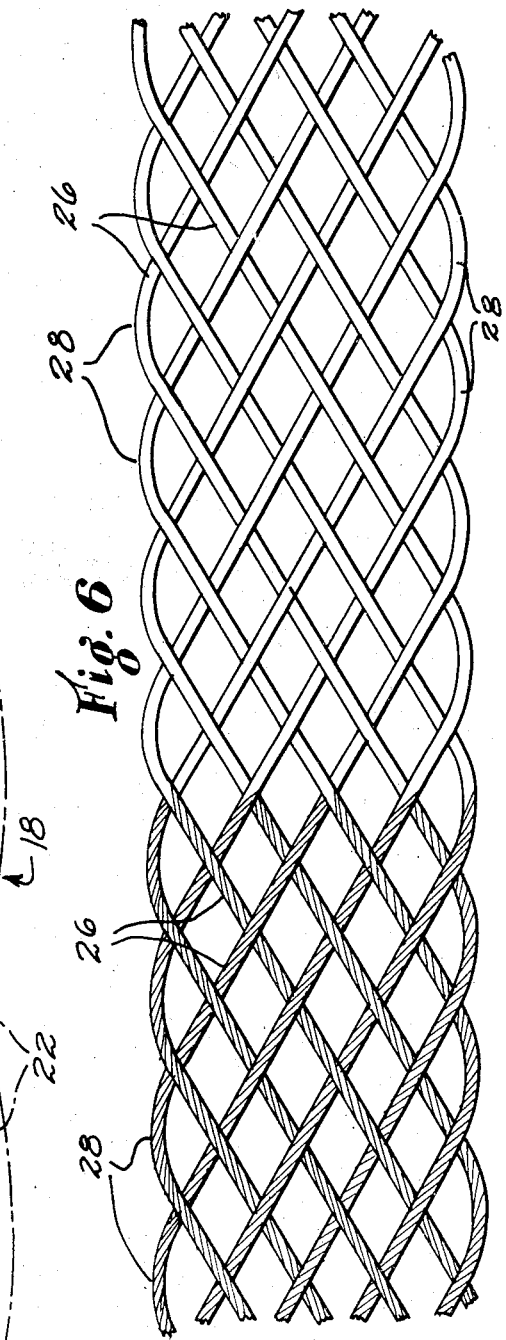
ROBERT C. PIERCE
INVENTOR.
BY McConkey and Booth
ATTORNEYS.

Patented Oct. 7, 1941

2,258,031

UNITED STATES PATENT OFFICE 2,258,031

REINFORCED ARTICLE

Robert C. Pierce, Niles, Mich., assignor to National Standard Company, Niles, Mich., a corporation of Michigan Application May 17, 1940, Serial No. 335,692

2 Claims. (Cl. 152—358)

This invention relates to reinforcing elements and reinforced articles and more particularly to flexible metal reinforcements and to tire casings or like articles embodying such reinforcements.

One of the objects of the invention is to provide a flexible reinforcing element in the form of a flat tape braided at least in part of metal wires twisted together. This construction provides a high degree of flexibility and resilience with very small bulk.

Another object of the invention is to provide a reinforcing element in the form of a flat braid of metal wires twisted together and which has been expanded widthwise. This greatly increases the resilience of the braid and at the same time opens up the spaces between the strands to permit the material to be reinforced to bond to itself through such spaces.

Still another object of the invention is to provide an article of rubber or the like reinforced by flat tapes of the type referred to with the rubber or like material adhering to the wires of the strands and to itself around and between the wires and strands. Specifically the invention relates to tire casings in which the reinforcements provide high strength with a relatively thin wall and high flexibility and resilience without separation of the reinforcing elements from the rubber.

The above and other objects and advantages of the invention will be apparent from the following description of the embodiments shown in the accompanying drawings, in which:

Figure 1 is a transverse section through a tire casing embodying the invention;

Figure 2 is an enlarged partial section similar to Figure 1;

Figure 3 is an elevation with successive layers broken away showing the construction of the casing;

Figure 4 is an enlarged plan view of one type of reinforcing material;

Figure 5 is a partial view similar to Figure 4 still further enlarged; and

Figure 6 is a plan view of an alternative construction.

The invention has been illustrated and will be described in connection with a casing for a pneumatic tire, but it will be understood that it is equally applicable to reinforced rubber or like articles of different types.

The tire illustrated in Figures 1 to 3 comprises a tread portion 10 and side walls 12 terminating in beads 14 reinforced by annular metallic elements 16. The tread and side walls of the tire are reinforced by a plurality of layers of reinforcing elements 18 which turn up around the reinforcements 16 and extend diagonally through the side walls and tread from one bead to the other. Four such layers are shown, although it will be apparent that more or less layers of reinforcing elements might be provided depending upon the strength required in the completed tire. The tire may also include one or more breaker strips 20 underlying the tread and formed of the same material as the reinforcing elements 18.

According to the present invention the reinforcing elements 18 are formed of strands 22 braided together in the form of a flat tape with each of the strands extending the full length of the tape diagonally back and forth across the side of the tape, over and under the other strands. In the braid shown in Figures 4 and 5, each strand passes alternately over and under two other strands and nine strands are employed, but it will be understood that the invention is not limited to this specific form of braid and that other lays might be used. One or more of the strands 22 are formed of metal wires 24 twisted together in the manner of a rope or cable. As seen in Figure 5 each of the strands 22 is formed of three such wires twisted together so that the complete tape includes twenty-seven wires. Preferably the wires are of high tensile strength steel of the magnitude of about .006" so that an extremely flexible tape of very high tensile strength is formed. A tape braided in this manner will be only slightly wider and somewhat thicker than a tape braided of single wires or sets of wires in parallel and provides much greater strength without sacrificing flexibility or resiliency.

The wires are preferably coated or plated with a bonding agent so that when they are incorporated in the tire casing the rubber of the casing will bond to the surfaces of the wires during vulcanization. In addition, the rubber will flow between and around the wires of the strands and between and around the strands themselves to bond to itself so that a very strong combined chemical and mechanical bond is formed between the braids and the rubber. This insures that the braids will be securely fastened in the tire casing and will not separate therefrom in use.

Due to the high strength and relative thinness of the braids a tire of given carrying capacity can be formed with a less number of reinforcing layers and consequently with less side wall thickness than heretofore. This, in itself, contributes to the flexibility of the tire which is further made possible by the high degree of flexibility possessed by the reinforcing braids. In addition to lateral flexibility the braids possess a limited degree of longitudinal resilience thus enabling the tire casing to bend and to absorb road shocks without damaging and without tearing the reinforcements loose from the material of the casing.

Figure 6 illustrates an alternative construction in which the reinforcing braid is formed of strands 26 similar to the strands 22 of Figures 4 and 5. In Figure 6, however, the braid has been expanded widthwise to open up the spaces between the several strands and to increase the sharpness of the reverse bends in the strand at the edges of the tape, as shown at 28. With this construction the longitudinal and widthwise resilience of the braid are increased, the reverse bends at 28 acting in the manner of a plurality of small springs. In addition, the opening up of the spaces between the strands enables the rubber of the casing to bond to itself to a greater degree so as to increase the mechanical interlock effect between the rubber and the braids.

It will be understood that the particular reinforced article, and the particular forms of reinforcements shown in the drawings are for purposes of illustration only and are not to be taken as a definition of the scope of the invention, reference being had for this purpose to the appended claims.

What is claimed is:

1. A tire casing comprising a tread and side walls and reinforced side beads, and having imbedded therein a plurality of layers of flat tapes relatively narrow with respect to their length and extending diagonally around the casing from one bead to the other, said tapes being arranged closely adjacent side by side in layers to form substantially uniform layers, each tape being made up of strands of substantially uniform size braided together with each strand crossing over and under other strands diagonally back and forth across the tape and formed with reverse bends at the edges of the tape so that the tape is resilient longitudinally in both tension and compression, at least a part of said strands being formed by a plurality of metal wires twisted together, the strands being spaced in the tape to leave openings therethrough and the material of the casing being bonded to the strands and to itself through said openings to bond the tape securely in the casing.

2. A tire casing comprising a tread and side walls and reinforced side beads, and having imbedded therein a plurality of layers of flat tapes relatively narrow with respect to their length and extending diagonally around the casing from one bead to the other, said tapes being arranged closely adjacent side by side in layers to form substantially uniform layers, each tape being made up of strands of substantially uniform size braided together with each strand crossing over and under other strands diagonally back and forth across the tape and spaced apart to leave openings through the tape of a width equal to several times the diameter of the strands, and formed with relatively sharp reverse bends at the edges of the tape so that the tape is resilient longitudinally in both tension and compression, at least a part of said strands being formed by a plurality of metal wires twisted together, the material of the casing being bonded to the strands and to itself through said openings to bond the tape securely in the casing.

ROBERT C. PIERCE.